(12) United States Patent
Gothi et al.

(10) Patent No.: US 11,461,194 B2
(45) Date of Patent: Oct. 4, 2022

(54) PARALLEL RESTORE OF A LARGE OBJECT

(71) Applicant: Cohesity, Inc., San Jose, CA (US)

(72) Inventors: Prashant Gothi, Milpitas, CA (US); Dominic Tu Ping Cheah, Milpitas, CA (US); Sai Madan Mohan Reddy Patlolla, San Jose, CA (US); Abhijit Chakankar, San Jose, CA (US); Suman Chandra Tokuri, Bangalore (IN); Prajakta Ayachit, Maharashtra (IN)

(73) Assignee: Cohesity, Inc., San Jose, CA (US)

( * ) Notice: Subject to any disclaimer, the term of this patent is extended or adjusted under 35 U.S.C. 154(b) by 69 days.

(21) Appl. No.: 17/085,172

(22) Filed: Oct. 30, 2020

(65) Prior Publication Data

US 2022/0138055 A1 May 5, 2022

(51) Int. Cl.
*G06F 16/00* (2019.01)
*G06F 11/14* (2006.01)
*G06F 16/11* (2019.01)

(52) U.S. Cl.
CPC ........ *G06F 11/1469* (2013.01); *G06F 16/122* (2019.01)

(58) Field of Classification Search
CPC .................... G06F 11/1469; G06F 16/122
See application file for complete search history.

(56) References Cited

U.S. PATENT DOCUMENTS

| 6,505,216 | B1* | 1/2003 | Schutzman | G06F 11/1458 |
| | | | | 714/E11.12 |
| 8,234,517 | B2* | 7/2012 | Bamford | G06F 16/27 |
| | | | | 714/33 |
| 2012/0150793 | A1* | 6/2012 | Carroll | G06F 16/282 |
| | | | | 707/602 |
| 2017/0262217 | A1* | 9/2017 | Pradhan | G06F 3/0649 |

\* cited by examiner

*Primary Examiner* — Shiow-Jy Fan
(74) *Attorney, Agent, or Firm* — Van Pelt, Yi & James LLP

(57) ABSTRACT

A request to restore an instance of an object that is stored in a storage associated with a cluster of nodes to a target destination is received. Data of the object is divided into a plurality of data portions. Corresponding data portions of the plurality of data portions are assigned to each node of a plurality of nodes of the cluster. It is determined that a first node of the cluster of nodes does not currently store in a storage associated with the first node at least a part of a corresponding data portion of the object assigned to the first node. At least the part of the corresponding data portion of the object assigned to the first node is received at the first node from a second node of the cluster of nodes. At least the part of the corresponding data portion of the object received from the second node is provided from the first node to the target destination.

20 Claims, 7 Drawing Sheets

PARALLEL RESTORE OF A LARGE OBJECT

BACKGROUND OF THE INVENTION

A storage system may be comprised of a plurality of nodes. The storage system may receive from a restore target a request to restore an instance (e.g., version) of an object that is stored by the storage system. The object may correspond to a file, a database, a virtual machine, etc. The object may have been backed up from the restore target to the storage system.

A node of the storage system may be tasked with restoring the instance of the object from the storage system to the restore target. However, the amount of time needed to restore the instance of the object is constrained by the amount of time needed by the node to read data associated with the object and provide the read data to the restore target. The node may read small batches of the object (e.g., 2 MB) and provide the read data to the restore target in a plurality of batches. It may take the node a long time to restore large files (e.g., files that are larger than a threshold size) to the restore target because there is a large amount of data for the node to read. The amount of time needed by the node to restore the instance of the object is directly related to the number of read and provide cycles performed by the node. As a result, the node may become a bottleneck to the restoration process.

BRIEF DESCRIPTION OF THE DRAWINGS

Various embodiments of the invention are disclosed in the following detailed description and the accompanying drawings.

DETAILED DESCRIPTION

Figure 1:
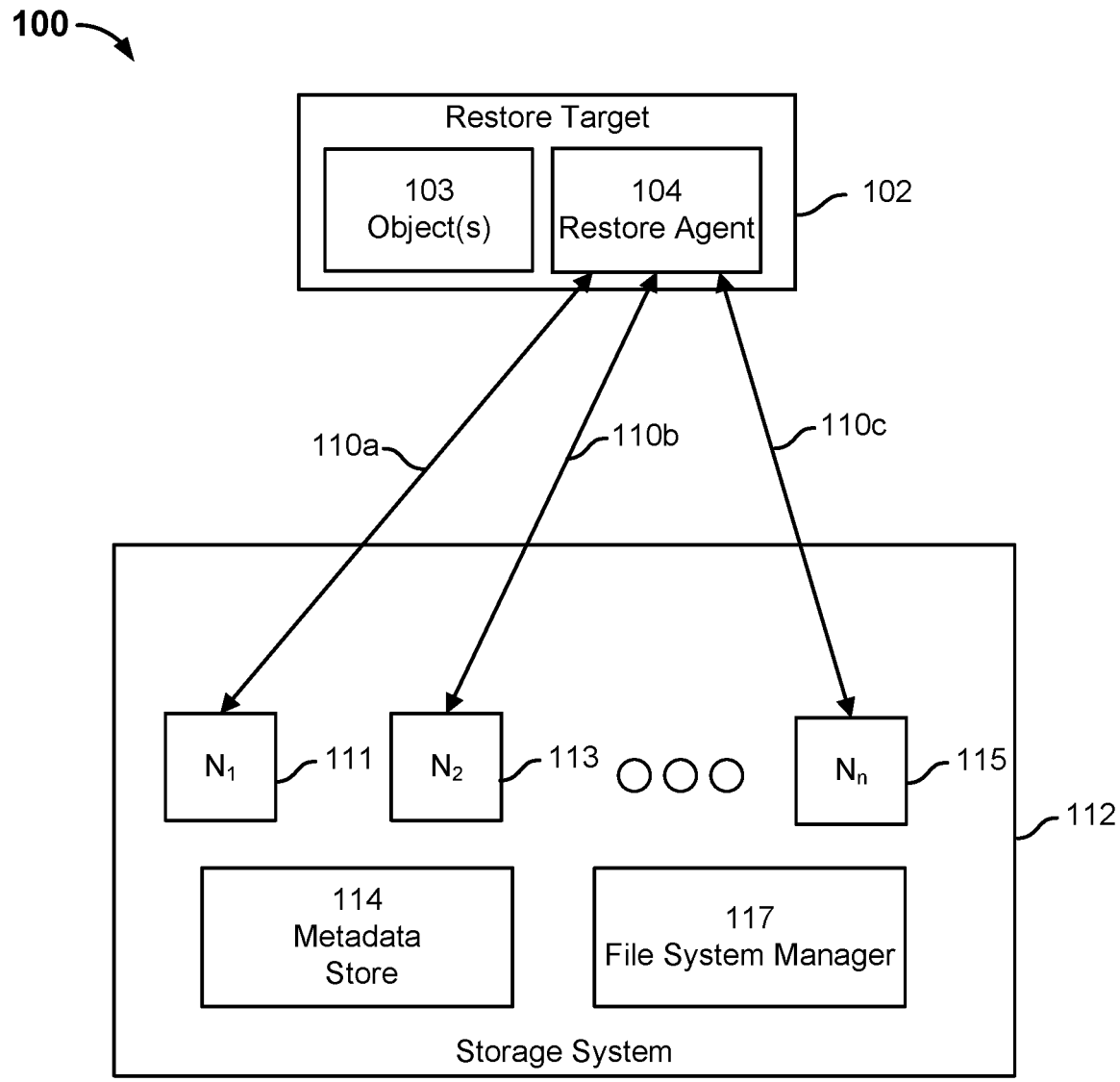
FIG. 1 is a block diagram illustrating a system for restoring an object in parallel in accordance with some embodiments.

Techniques to efficiently restore an instance of an object are disclosed herein. A storage system may include a cluster of nodes that are configured to backup instances of objects received from a restore target. Data associated with an instance of an object may be stored in storage associated with the cluster nodes.

The storage system may receive a request to restore a backup of an instance (e.g., a version) of an object to a restore target. In response to the request, the storage system may determine a size of the requested object. For objects having a determined size that is greater than or equal to a threshold size (e.g., 1 TB), an orchestrating node of the cluster may divide the object into a plurality of data portions. In some embodiments, the object is divided into data portions of equal size. In some embodiments, the object is divided into data portions of variable size. In some embodiments, the object is divided into data portions that are based on capabilities associated with nodes of the cluster (e.g., bandwidth, processing, memory, etc.). In some embodiments, the object is divided into a number of data portions that equal the number of nodes of the cluster. In some embodiments, the object is divided into a number of data portions that is greater than the number of nodes of the cluster. In some embodiments, the object is divided into a number of data portions that is less than the number of nodes of the cluster.

The orchestrating node may assign each node of a plurality of the nodes a corresponding data portion of the object. In some embodiments, the orchestrating node assigns some of the plurality of nodes a corresponding data portion of the object. In some embodiments, the orchestrating node assigns all of the plurality of nodes a corresponding data portion of the object. The plurality of the nodes may restore their corresponding assigned data portions, in parallel, to the restore target. In contrast to a single node restoring the object to the restore target, using a plurality of nodes to restore the object reduces the amount of time needed to restore the instance of the object because a plurality of nodes may read the data associated with the object in parallel, and provide, in parallel, the read data to the restore target.

The data associated with an assigned data portion may be stored in a plurality of storages associated with the nodes. Each node may have a unique associated storage. A node may analyze an assigned data portion to determine the data chunk(s) associated with the assigned data portion that are stored in a storage associated with the node and the data chunk(s) associated with the assigned data portion that are not stored in a storage associated with the node. The node may request from one or more other nodes of the cluster the data chunk(s) associated with the assigned data portion that are not currently stored in a storage associated with the node. The node may receive from the one or more other nodes of the cluster the data chunk(s) associated with the assigned data portion that are not currently stored in a storage associated with the node.

The node may provide the restore target with data chunk(s) associated with the assigned portion. In some embodiments, the node batches data chunks and after a batch threshold (e.g., size or number) of data chunks is stored in a storage associated with the node, the node provides the batch of data chunks to the restore target. The data chunk(s) included in the batch may include data chunks stored in a storage associated with the node and/or the data chunk(s) received from one or more other nodes of the cluster. In some embodiments, the node initially provides to the restore target all of the data chunk(s) associated with the assigned portion that are stored in a storage associated with the node and then provides to the restore target data chunk(s) associated with the assigned portion in the order the data chunk(s) are received from the one or more other nodes of the cluster.

Prior to the requested object being restored, the storage system may provide the restore target an indication that the requested object is to be restored. In response to the request, the restore target may generate a sparse file for the object to be restored. A sparse file may be a placeholder file that is pre-allocated a certain amount of space in storage. The certain amount of space that is allocated is at least the size of the object to be restored. In response to receiving a data portion from a node, the restore target may populate the sparse file with the received data portion. In addition to providing data associated with a data portion, a node may also provide file offset information associated with the data portion. The file offset information may include a file offset and length for the data associated with the data portion. The file offset information may indicate an offset relative to the beginning of the sparse file. The restore target may use the file offset information from the received data portions to populate the sparse file. After all of the data portions have been received, the restore target may finalize the sparse file into a file that is ready to be used on the restore target.

FIG. 1 is a block diagram illustrating a system for restoring an object in parallel in accordance with some embodiments. In the example shown, system 100 includes restore target 102 and storage system 112.

Restore target 102 is a computing system that stores file system data. The file system data may include data associated with one or more objects (e.g., content files, text files, database files, database, virtual machine, a container, an application, etc.) and metadata associated with the one or more objects (e.g., creation time, owner, modification time, file size, etc.). The file system data is stored in one or more storage volumes (not shown). Restore target 102 may be comprised of one or more servers, one or more computing devices, one or more storage devices, and/or a combination thereof. Restore target 102 may be configured to send a backup snapshot of file system data to storage system 112 according to one or more backup snapshot policies. In some embodiments, a backup snapshot policy indicates that file system data is to be backed up on a periodic basis (e.g., hourly, daily, weekly, monthly, etc.), when a threshold size of data has changed, or in response to a command from a user associated with restore target 102.

A backup agent (not shown) may be configured to cause restore target 102 to perform a backup snapshot (e.g., a full backup snapshot or incremental backup snapshot). A full backup snapshot may include all of the file system data of restore target 102 at a particular moment in time. In some embodiments, a full backup snapshot for a particular object of the one or more objects 103 is performed and the full backup snapshot of the particular object includes all of the data associated with the particular object at a particular moment in time. An incremental backup snapshot may include all of the file system data of restore target 102 that was not included in a previous backup snapshot. In some embodiments, an incremental backup snapshot for a particular object of the one or more objects 103 is performed and the incremental backup snapshot of the particular object includes all of the data associated with the particular object that was not included in a previous backup snapshot.

In some embodiments, a backup agent is running on restore target 102. In some embodiments, a backup agent is running on a system hosting an object of the one or more objects 103. In some embodiments, a backup agent is running on restore target 102 and a separate backup agent is running in one of the one or more objects 103. In some embodiments, an object includes a backup function and is configured to perform a backup snapshot on its own without a backup agent. In some embodiments, restore target 102 includes a backup function and is configured to perform a backup snapshot on its own without a backup agent. In some embodiments, storage system 112 may provide instructions to restore target 102, causing restore target 102 to execute backup functions without a backup agent.

Storage system 112 is comprised of a storage cluster that includes a plurality of nodes 111, 113, 115. Although three nodes are shown, storage system 112 may be comprised of n nodes. In some embodiments, a node includes a processor and memory, and is coupled to a separate storage device. The separate storage device may include one or more flash storage devices. A flash storage device may be segmented into a plurality of partitions. In some embodiments, one of the partitions is configured to store all of the metadata included in metadata store 114. In some embodiments, a partition is configured to store some of the metadata in metadata store 114 and the metadata included in metadata store 114 is stored in a plurality of partitions. A node may be allocated one of the partitions that stores some of metadata store 114. Each of the nodes 111, 113, 115 may be allocated one or more of the partitions. In some embodiments, a partition is not allocated to more than one node, e.g., shared between nodes. The one or more partitions allocated to a node may be configured to store data associated with some or all of the plurality of objects that were backed up to storage system 112. For example, the separate storage device may be segmented into 10 partitions and storage device 112 may include 10 nodes. Each node of the 10 nodes may be allocated one of the 10 partitions.

In some embodiments, a node includes a processor, memory, and a storage device. The storage device may be configured to store metadata associated with a plurality of objects that were backed up to storage system 112, such as part or all of metadata store 114. The node may be coupled to a separate storage device. The separate storage device may include one or more flash storage devices. A flash storage device may be segmented into a plurality of partitions. Each of the nodes 111, 113, 115 may be allocated one or more of the partitions. In some embodiments, a partition is not allocated to more than one node, e.g., shared between nodes. The one or more partitions allocated to a node may be configured to store data associated with some or all of the plurality of objects that were backed up to storage system 112. For example, the separate storage device may be segmented into 10 partitions and storage device 112 may include 10 nodes. Each node of the 10 nodes may be allocated one of the 10 partitions.

In some embodiments, a node includes a processor, memory, and a plurality of storage devices. A first storage device may be configured to store metadata associated with a plurality of objects that were backed up to storage system 112, such as part or all of metadata store 114. A second storage device may be configured to store data associated with the plurality of objects that were backed up to storage system 112. The plurality of storage devices may include one or more solid state drives, one or more hard disk drives, or a combination thereof.

Storage system 112 may be a cloud instantiation of a storage system. A configuration of a cloud instantiation of storage system 112 may be a virtual replica of storage system 112. For example, storage system 112 may be comprised of three storage nodes, each storage node with a storage capacity of 10 TB. A cloud instantiation of storage system 112 may be comprised of three virtual nodes, each virtual node with a storage capacity of 10 TB. In other embodiments, a cloud instantiation of storage system 112 may have more storage capacity than an on-premises instantiation of storage system 112. In other embodiments, a cloud instantiation of storage system 112 may have less storage capacity than storage system 112.

Storage system 112 may be configured to ingest a backup snapshot received from restore target 102 and configured to store the data associated with the backup snapshot in storage associated with the nodes 111, 113, 115. Storage system 112 may receive and ingest the file system data associated with a backup snapshot. Storage system 112 may include a file system manager 117 that is configured to organize the file system data of the backup snapshot using an index. The index may be a tree data structure. An example of the tree data structure is a snapshot tree, which may be based on a B+ tree structure (or other type of tree structure in other embodiments). Storage system 112 may store a plurality of tree data structures in metadata store 114. Storage system 112 may generate a snapshot tree and one or more object metadata structures for each backup snapshot. An object metadata structure may be referred to as a "file metadata structure."

In the event the backup snapshot corresponds to a full backup of restore target 102, a view corresponding to the backup snapshot may be comprised of a snapshot tree and one or more object metadata structures. The snapshot tree may be configured to store the file system metadata associated with restore target 102. An object metadata structure may be configured to store the metadata associated with one of the objects stored on restore target 102. Each of the objects included in a backup snapshot may have a corresponding object metadata structure. In some embodiments, the metadata associated with a large object (e.g., an object with a size greater than or equal to a threshold) is stored across a plurality of object metadata structures.

In the event the backup snapshot corresponds to a full backup of one of the one or more objects 103, such as a virtual machine, a view corresponding to the backup snapshot may be comprised of a snapshot tree and one or more object metadata structures. The snapshot tree may be configured to store the metadata associated with one of the one or more objects 103. An object metadata structure may be configured to store the metadata associated with a file included in the object, such as a file included in a virtual machine.

The tree data structure may be used to capture different views of data. A view of data may correspond to a full backup snapshot, an incremental backup snapshot, a clone of data, a file, etc. The tree data structure allows a chain of snapshot trees to be linked together by allowing a node of a later version of a snapshot tree to reference a node of a previous version of a snapshot tree. The previous version of the snapshot tree may correspond to an earlier backup snapshot. For example, a root node or an intermediate node of a snapshot tree corresponding to a second backup snapshot may reference an intermediate node or leaf node of a snapshot tree corresponding to a first backup snapshot.

A snapshot tree is a representation of a fully hydrated restoration point because it provides a complete view of a restore target, an object, or data generated on or by the storage system at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 112 maintains fully hydrated restoration points. Any file associated with restore target 102, an object at a particular time and the object's contents, or a file generated on or by the storage system, for which there is an associated reference restoration point, may be determined from the snapshot tree, regardless if the associated reference restoration was a full reference restoration point or an intermediate reference restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size (e.g., 256 kb), an identifier of a data brick, a pointer to a metadata structure (e.g., object metadata structure), a pointer to a data chunk stored on the storage cluster, etc.

An object metadata structure may include a root node, one or more levels of one or more intermediate nodes associated with the root node, and one or more leaf nodes associated with an intermediate node of the lowest intermediate level. The tree data structure associated with an object metadata structure allows a chain of object metadata structures corresponding to different versions of an object, an object file, or a file to be linked together by allowing a node of a later version of an object metadata structure to reference a node of a previous version of an object metadata structure. Each root node of the tree data structure may be associated with a different instance (e.g., version) of an object. The object metadata structure is configured to store metadata associated with an object that enables the data chunks associated with the object to be located.

A leaf node of an object metadata structure may store a value, such as an identifier of a data brick associated with one or more data chunks. The location of the one or more data chunks associated with a data brick may be identified using one or more data structures (e.g., list, table, etc.) stored in metadata store 114. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier.

A chunk file having the identified chunk file identifier is comprised of a plurality of data chunks. An object to which the chunk file is associated, is comprised of a plurality of chunk files. In some embodiments, a chunk file is stored in a storage associated with one of the nodes 111, 113, 115. In some embodiments, a chunk file is stored across corresponding storages associated with the nodes 111, 113, 115. The chunk file metadata table may be used to identify one or more locations of the plurality of data chunks. The chunk file metadata table may include offset information of the plurality of data chunks within a chunk file. The first or second data structure may indicate a node of the storage cluster that is associated with storage that stores a data chunk or a chunk file. Each of the nodes 111, 113, 115 may be associated with corresponding storage that stores a corresponding version of metadata store 114.

Storage system 112 may receive a request to restore a backup of an instance of an object to restore target 102 (e.g., target destination). In some embodiments, the request is received from restore target 102. In some embodiments, the request is received from a cloud portal or management system associated with restore target 102. In some embodiments, the request is received from a client device (not shown) associated with restore target 102. In some embodiments, the data associated with the object is stored in a storage associated with one of the nodes 111, 113, 115. In some embodiments, the data associated with the object is stored in corresponding storages associated with the plurality of nodes 111, 113, 115.

In response to the request, storage system 112 may determine a size associated with the requested object and compare the determined size to a threshold size (e.g., 1 TB). In some embodiments, the determined size is not greater than or equal to the threshold size and an orchestrating node of storage system 112 assigns one of the nodes 111, 113, 115 to restore the requested object to restore target 102. The orchestrating node may be one of the nodes 111, 113, 115. In some embodiments, the object is a virtual machine or a database. Such objects may require restoring multiple files. In some embodiments, one or more of the files associated with an object may be restored using the techniques disclosed herein.

In some embodiments, the determined size is greater than or equal to the threshold size and an orchestrating node of storage system 112 divides the requested object into a plurality of data portions. In some embodiments, the object is divided into data portions of equal size. In some embodiments, the object is divided into data portions of variable size. In some embodiments, the object is divided into data portions that are based on capabilities associated with a node of the cluster (e.g., bandwidth, processing, memory, etc.). In some embodiments, the size of a data portion assigned to a node may be proportional to capabilities or available capacity of the node. As a result, in some embodiments, a relatively small data portion may be assigned to a node having low available capacity or relatively poor capabilities whereas a relatively large data portion may be assigned to a node having high available capacity or relatively powerful capabilities. In some embodiments, the object is divided into a number of data portions that equal the number of nodes of the cluster. In some embodiments, the object is divided into a number of data portions that is less than the number of nodes of the cluster. In some embodiments, the object is divided into a number of data portions that is greater than the number of nodes of the cluster. In the event the number of data portions is greater than the number of nodes of the cluster, then the orchestrating node of the cluster establishes a data portion queue and assigns a data portion included in the queue to a node of the cluster when the node becomes available to restore the data portion to restore target 102 (e.g., after the node has completed restoring a previous data portion to restore target 102).

The orchestrating node may assign a plurality of the nodes a corresponding data portion of the object. In some embodiments, each of the nodes 111, 113, 115 are assigned a corresponding data portion of the object. In some embodiments, at least two of the nodes 111, 113, 115 are each assigned a corresponding data portion of the object. In some embodiments, the orchestrating node assigns a data portion to a node based on capabilities associated with the node of the cluster (e.g., available resources, bandwidth, processing, memory, etc.). In some embodiments, the orchestrating node is configured to dynamically load balance the plurality of data portions of the object based on a current resource capacity associated with a node. In some embodiments, a node is not assigned a data portion of the object because the node does not currently have the resources available to perform the restore operation. For example, the resources of a node are being used for other purposes. In some embodiments, a data portion is not assigned to a node in the event the node does not meet a minimum requirement (e.g., storage corresponding to the node has a minimum amount of free space, average CPU utilization of the node is less than a threshold, node-to-node throughput is below a threshold, error conditions etc.). In some embodiments, the orchestrating node recalls a data portion assigned to a node in the event the node is unable to restore a corresponding assigned data portion within a threshold amount of time. The orchestrating node may reassign the recalled data portion to a different node of the cluster.

The plurality of the nodes may restore their corresponding assigned data portions, in parallel, to restore target 102. For example, nodes 111, 113, 115 may restore their corresponding assigned data portions to restore agent 104 via connections 110a, 110b, 110c, respectively. Connections 110a, 110b, 110c may be a wireless or wired connection. Connections 110a, 110b, 110c may communicate data and/or information via a local area network, a wide area network, a storage area network, campus area network, metropolitan area network, system area network, intranet, the Internet, and/or a combination thereof.

The data associated with an assigned data portion may be stored across a plurality of the nodes 111, 113, 115. A node, such as one of the nodes 111, 113, 115, may analyze an assigned data portion to determine the data chunk(s) associated with the assigned data portion that are stored in a storage associated with the node and the data chunk(s) associated with the assigned data portion that are not stored in a storage associated with the node. A node may determine the data chunk(s) associated with the assigned data portion that are not stored in a storage associated with the node by inspecting a data structure stored in metadata store 114. In some embodiments, the node traverses a tree data structure to determine one or more locations for a data chunk that is included in an assigned data portion. The data structure may indicate the one or more data chunk(s) associated with the assigned data portion that are stored in a storage associated with the node. The node may determine corresponding storage locations for the data chunk(s) that are not stored in a storage associated with the node. In some embodiments, the data structure indicates corresponding storage locations for the data chunks associated with the assigned data portion (e.g., the first or second data structure described above). In some embodiments, the determined corresponding storage locations for the data chunk(s) that are not stored in a storage associated with the node include one or more of the other nodes 111, 113, 115 of storage system 112.

The node may request from one or more other nodes of the cluster the data chunk(s) associated with the assigned data portion that are not currently stored in a storage associated with the node. For example, a first node requests from a second node, specific data chunk(s) that the first node determined that are stored in a storage associated with the second node. In another example, the first node sends to the second node a range of file offsets associated with the assigned data portion of the object and requests the second node to provide any data chunk(s) included in the range of file offsets that are stored in a storage associated with the second node. In some embodiments, a length of the file offset (e.g., 2 MB) is less than the length of the assigned data portion (e.g., 100 GB).

In response to receiving a request, the second node may perform a lookup to determine whether any data chunks associated with a data portion assigned to the first node are stored in a storage associated with the second node. The second node may provide the first node with the data chunk(s) that are determined to be stored in a storage associated with the second node. In some embodiments, the second node is configured to prefetch from a storage associated with the second node data chunk(s) that are included in a data portion assigned to the first node, but not included in the file offset requested by the first node. For example, the first node may be assigned 100 GB of data, but request from the second node data chunks in 2 MB increments. The second node may prefetch data chunks that are outside of the 2 MB increments.

The first node may receive from the one or more other nodes of the cluster the data chunk(s) associated with the assigned data portion that are not currently stored in a storage associated with the first node. The received data chunk(s) may be stored in a cache associated with the first node (e.g., in-memory cache or other storage associated with the first node or combinations thereof).

The node (e.g., the first node) may provide restore target 102 data chunk(s) associated with the assigned portion. In some embodiments, the node initially provides to restore target 102 all of the data chunk(s) associated with the assigned portion that are stored in a storage associated with the node and then provides data chunk(s) associated with the assigned portion to restore target 102 in the order the data chunk(s) are received from the one or more other nodes of the cluster. In some embodiments, the node batches data chunks and after a batch threshold of data chunks is stored in a storage associated with the node, the node provides the batch of data chunks to restore target 102. The data chunk(s) included in the batch may include data chunks stored in a storage associated with the node and/or the data chunk(s) received from one or more other nodes of the cluster. In some embodiments, the data chunk(s) associated with the assigned portion are compressed. In the event the data chunk(s) associated with the assigned portion are compressed, the data chunk(s) associated with the assigned portion are decompressed prior to being restored to restore target 102.

Prior to the requested object being restored, storage system 112 may provide restore target 102 an indication that the requested object is to be restored. In response to the request, restore target 102 may generate a sparse file for the object to be restored. In some embodiments, the sparse file is generated at the time of the request to restore a backup of an instance of an object. In some embodiments, restore agent 104 generates the sparse file. Using a restore agent to restore the object enables storage system 112 to avoid authentication problems that might otherwise occur if the object was restored without using restore agent 104. In some embodiments, the sparse file is generated without the use of restore agent 104 (e.g., through the use of server message block (SMB) protocols).

In response to receiving a data portion from one of the nodes 111, 113, 115, restore agent 104 may populate the sparse file with the received data portion (e.g., write the data chunks to the sparse file). In addition to providing data associated with a data portion, a node may also provide file offset information associated with the data portion. The file offset information may include a file offset and length associated with the data portion. Restore agent 104 may use the file offset information from the received data portions to populate the sparse file. After all of the data portions have been received, restore agent 104 may finalize the sparse file into a file that is ready to be used and accessible on restore target 102. For example, a backup of an object may have an associated type and certain attributes (ownership, permissions, etc.). The sparse file associated with a restored object may be finalized to have the associated type and attributes of the object that was backed up.

After a node has completed restoring an assigned data portion to restore target 102, restore agent 104 may provide to the node an acknowledgement that indicates the assigned data portion has been restored to restore target 102. After receiving the acknowledgement, the node may provide the acknowledgement to an orchestrating node of the cluster.

During the process of restoring an object from storage system 112 to restore target 102, one of the nodes 111, 113, 115 may go offline before the node has completed restoring an assigned data portion. In some embodiments, the orchestrating node determines that one of the nodes 111, 113, 115 is offline. In response to determining the node is offline, the orchestrating node may determine a last acknowledgement received from the offline node. The orchestrating node may determine an assigned data portion of the object that is currently assigned to the offline node. In the event the last acknowledgement received from the offline node is not associated with the data portion of that object that is currently assigned to the offline node, the orchestrating node may reassign that data portion to a different node of the cluster.

Figure 2A:
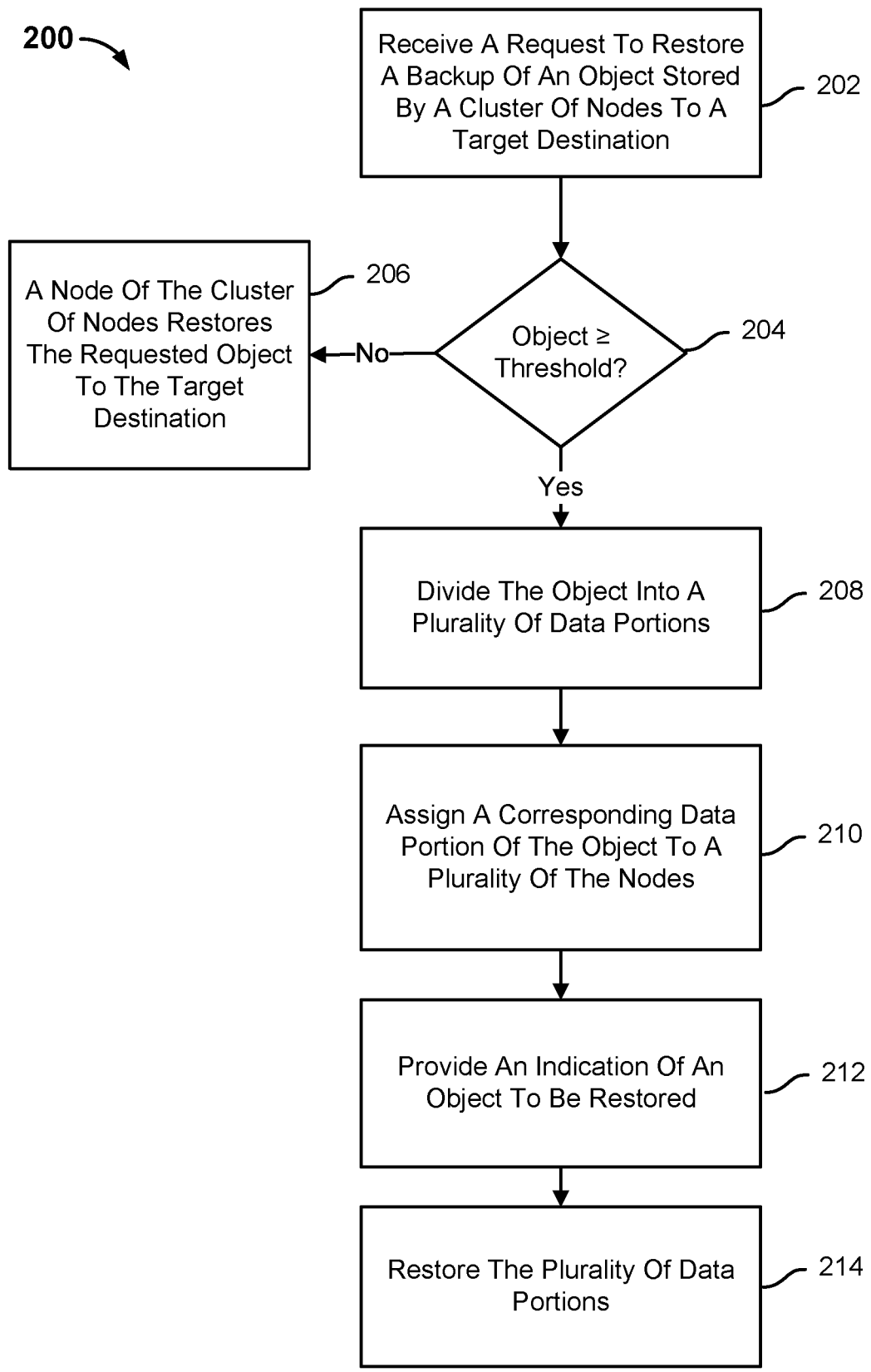
FIG. 2A is a flow diagram illustrating a process for restoring an object in parallel in accordance with some embodiments.

FIG. 2A is a flow diagram illustrating a process for restoring an object in parallel in accordance with some embodiments. In the example shown, process 200 may be implemented by a storage system, such as storage system 112.

At 202, a request to restore a backup of an instance of an object stored by a cluster of nodes to a target destination is received. In some embodiments, the request is received from the target destination. In some embodiments, the request is received from a cloud portal or management system associated with the target destination.

At 204, it is determined whether a size of the object is greater than or equal to a threshold size. The threshold size may be configured by an administrator of the cluster. The threshold size may be configured based on a size and/or a priority of the restore. A storage system may compare the size of the object to the threshold size. In the event the size of the object is determined to be greater than or equal to the threshold size, process 200 proceeds to 208. In the event the size of the object is not determined to be greater than or equal to the threshold size, process 200 proceeds to 206.

At 206, a node of the cluster of nodes restores the requested object to the target destination. The cluster may include an orchestrating node. The orchestrating node may assign one of the nodes of the cluster to restore the requested object. In some embodiments, restoring the object may require a node to retrieve data associated with the requested object from one or more other nodes of the cluster.

At 208, the object is divided into a plurality of data portions. An orchestrating node of the cluster may divide the requested object into a plurality of data portions. In some embodiments, the object is divided into data portions of equal size. In some embodiments, the object is divided into data portions of variable size. In some embodiments, the object is divided into data portions that are based on capabilities associated with a node of the cluster (e.g., bandwidth, processing, memory, etc.). In some embodiments, the object is divided into a number of data portions that equal the number of nodes of the cluster.

In some embodiments, the object is divided into a number of data portions based on a size and/or priority of the restore. In some embodiments, the object is divided into a number of data portions that is less than the number of nodes of the cluster. In some embodiments, the object is divided into a number of data portions that is greater than the number of nodes of the cluster. In the event the number of data portions is greater than the number of nodes of the cluster, then the orchestrating node of the cluster establishes a data portion queue for the unassigned data portion(s) and assigns a data portion included in the queue to a node of the cluster when the node becomes available to restore the data portion to the target destination (e.g., after the node has completed restoring a previous data portion to the target destination).

At 210, each of a plurality of the nodes is assigned a corresponding data portion of the object. The plurality of nodes may be each assigned a corresponding data portion of the object based on a file offset associated with the object. For example, a first node may be assigned 0-100 GB of the object, a second node may be assigned 101 GB-200 GB of the object, . . . , and an nth node may be assigned (N–100) GB-N GB of the object. In some embodiments, all of the nodes of the cluster are assigned a corresponding data portion of the object. For example, the cluster may be comprised of 10 nodes and each of the 10 nodes is assigned a corresponding data portion. In some embodiments, at least two of the nodes of the cluster are each assigned a corresponding data portion of the object. For example, the cluster may be comprised of 10 nodes and 5 of the nodes are each assigned a corresponding data portion.

In some embodiments, the orchestrating node assigns a data portion to a node based on capabilities associated with the node of the cluster (e.g., available resources, bandwidth, processing, memory, etc.). In some embodiments, a node is not assigned a data portion of the object because the node does not currently have the resources available to perform the restore operation.

In some embodiments, the metadata associated with an object is stored across a plurality of object metadata structures. The orchestrating node may assign a node a data portion of the object that corresponds to an object metadata structure. For example, the metadata associated with an object may be stored across five object metadata structures. Each of the object metadata structures is associated with a corresponding data portion of the object. The orchestrating node may assign a first node a data portion of the object that corresponds to a first object metadata structure, a second node a data portion of the object that corresponds to a second object metadata structure, . . . , and a fifth node a data portion of the object that corresponds to a fifth object metadata structure.

At 212, an indication of an object to be restored is provided. The indication may be provided to the target destination. In response, the target destination may generate a sparse file for the object. Step 212 may be performed any time during process 200 after step 202.

At 214, each of the plurality of data portions is restored to the target destination. Each of the nodes assigned a corresponding data portion of the object may read data associated with an assigned data portion and provide data associated with the corresponding data portion of the object, in parallel, to the target destination. In contrast to a single node restoring the object to the target destination, using a plurality of nodes to restore the object reduces the amount of time needed to restore the instance of the object because a plurality of nodes may read the data associated with the object in parallel, and provide, in parallel, the read data to the target destination.

Each of the nodes having an assigned data portion may locate a tree data structure that corresponds to the instance of the object and traverse the tree data structure that stores metadata associated with the object to locate the data associated with the corresponding assigned data portion of the object. Each of the nodes may read the data associated with the corresponding assigned data portion based on a traversal of the tree data structure and provide the corresponding read data to the target destination.

Figure 2B:
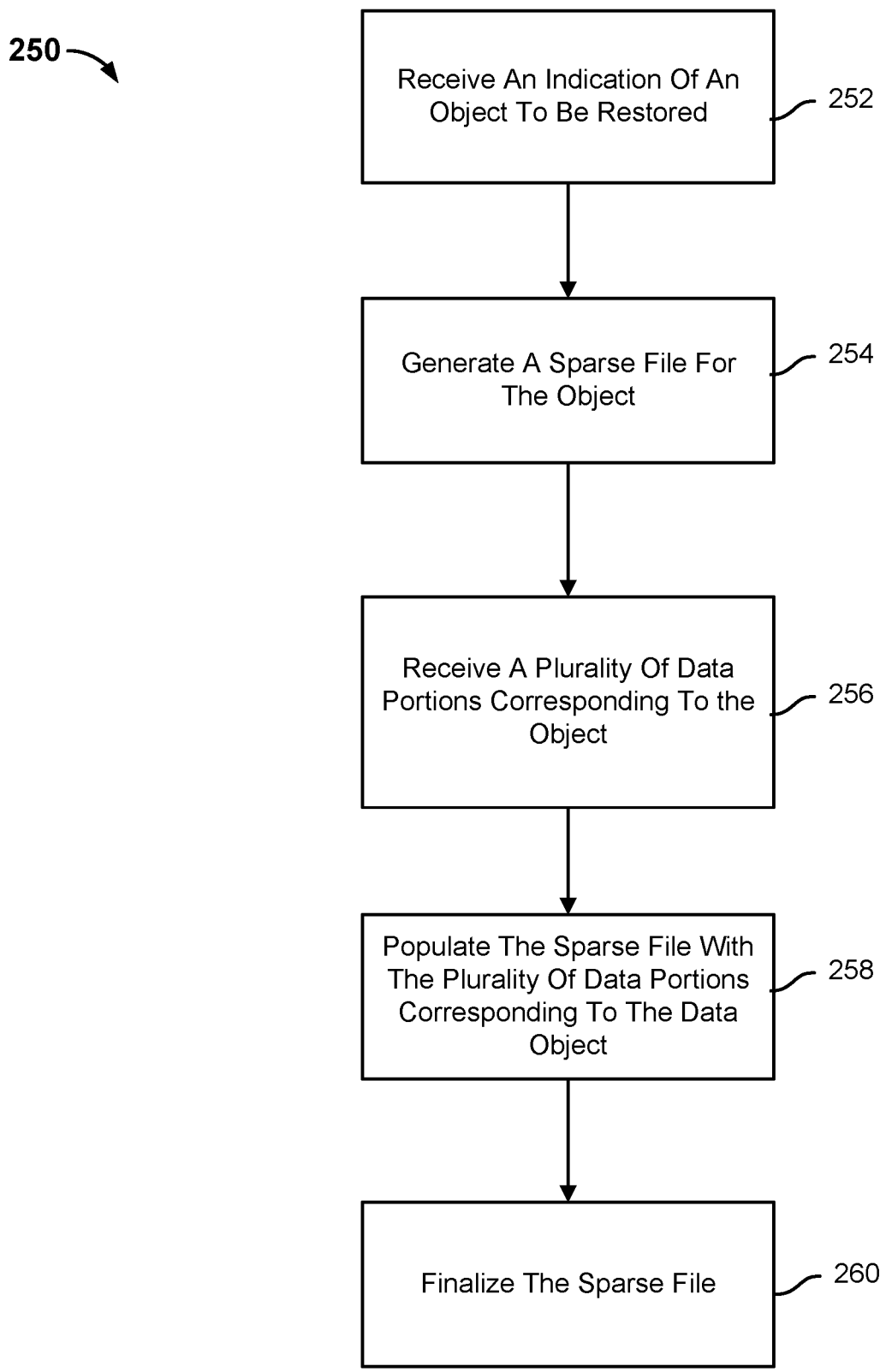
FIG. 2B is a flow diagram illustrating a process for restoring an object in parallel in accordance with some embodiments.

FIG. 2B is a flow diagram illustrating a process for restoring an object in parallel in accordance with some embodiments. In the example shown, process 250 may be implemented by a system, such as restore target 102.

At 252, an indication of an object to be restored is received. The indication may be received from a storage system after a target destination, such as restore target 102, requested the object to be restored.

At 254, a sparse file is generated for the object. In some embodiments, a restore agent associated with the target destination generates the sparse file. In some embodiments, the target destination generates the sparse file without using a restore agent.

At 256, a plurality of data portions corresponding to the object are received. The plurality of data portions may be received, in parallel, from corresponding nodes of the cluster. A data portion of the plurality of data portions may be received with file offset information. The file offset information may include a file offset and length associated with the data portion.

At 258, the sparse file is populated with the plurality of data portions corresponding to the data object. A restore agent may write in the sparse file the data associated with a received data portion to a file offset associated with the received data portion.

At 260, the sparse file is finalized. The sparse file is finalized after all of the data portions associated with a requested object are restored to the target destination. The sparse file is finalized into a file that is ready to be used on the target destination.

Figure 3:
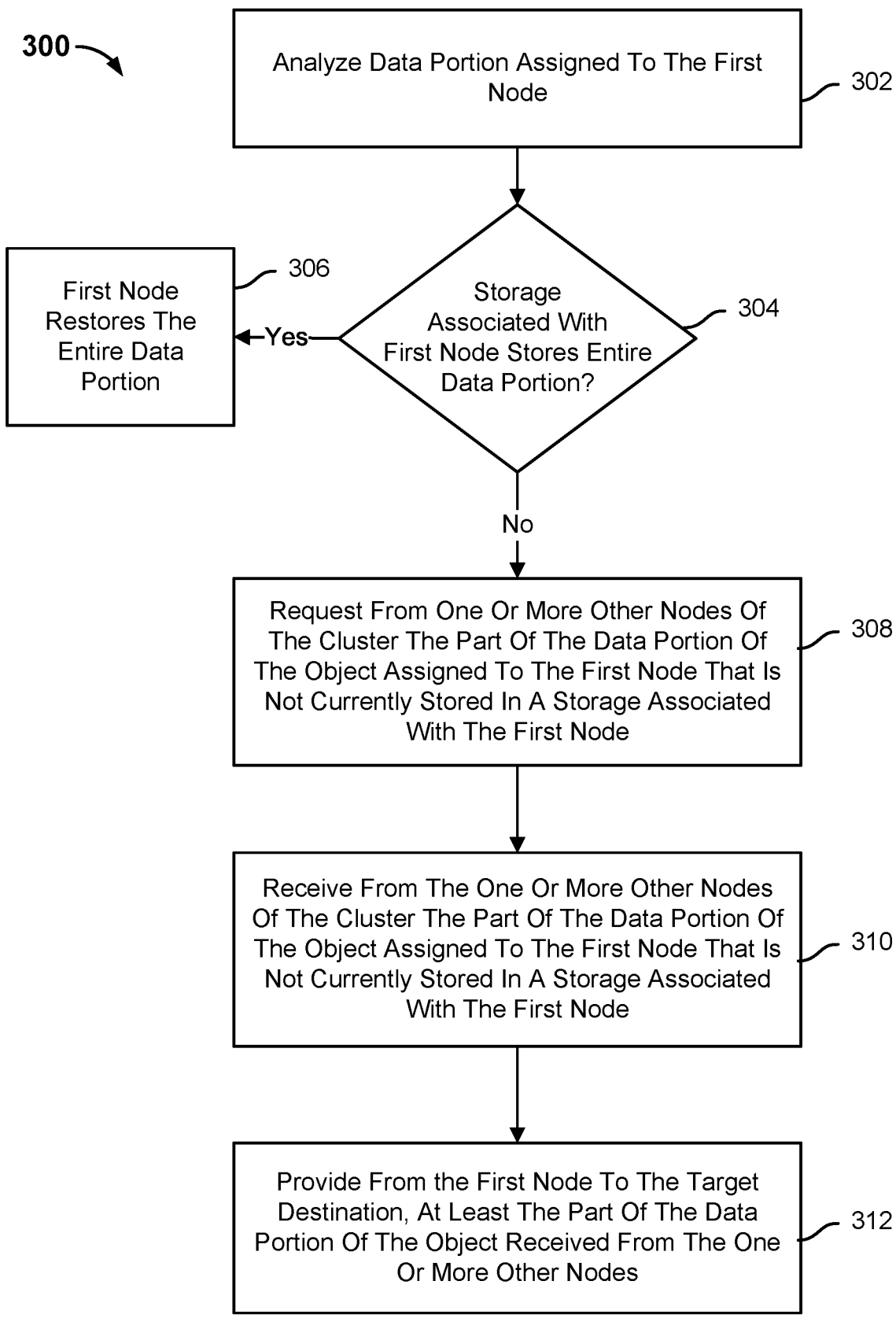
FIG. 3 is a flow diagram illustrating a process for restoring a data portion of an object in accordance with some embodiments.

FIG. 3 is a flow diagram illustrating a process for restoring a data portion of an object in accordance with some embodiments. In the example shown, process 300 may be implemented by a node, such as one of the nodes 111, 113, 115. In some embodiments, process 300 is implemented to perform some or all of step 214 of process 200.

At 302, a data portion assigned to the first node is analyzed. The data portion is comprised of a plurality of data chunks. In some embodiments, the first node traverses a tree data structure to determine location(s) for data chunks that are included in an assigned data portion. In some embodiments, the data chunks that are included in the assigned data portion are all stored in a storage associated with the first node. In some embodiments, the data chunks that are included in the assigned data portion are stored in a storage associated with the first node and corresponding storages associated with one or more other nodes. In some embodiments, the data chunks included in the assigned data portion are stored in corresponding storages associated with one or more other nodes. In some embodiments, a storage associated with the first node stores a data structure that indicates the one or more data chunk(s) associated with the assigned data portion that are stored in the storage associated with the first node.

At 304, it is determined whether the entire data portion assigned to the first node is stored by a storage associated with the first node. In the event the entire data portion assigned to the first node is stored by a storage associated with the first node, process 300 proceeds to 306. In the event the entire data portion assigned to the first node is not stored by a storage associated with the first node, process 300 proceeds to 308.

At 306, the first node restores the entire data portion to the target destination. At 308, the part of the data portion of the object assigned to the first node that is not currently stored in a storage associated with the first node is requested from one or more other nodes of the cluster.

The first node may analyze an assigned data portion to determine the data chunk(s) associated with the assigned data portion that are not stored in a storage associated with the first node. A first node may determine the data chunk(s) associated with the assigned data portion that are not stored in a storage associated with the node by inspecting a data structure stored in a metadata store that is stored in a storage associated with the first node. The data structure may indicate the one or more data chunk(s) associated with the assigned data portion that are stored in a storage associated with the first node.

In some embodiments, the first node may use the data structure to determine corresponding storage locations for the data chunk(s) that are not stored in a storage associated with the node. In some embodiments, the data structure indicates corresponding storage locations for the data chunks associated with the assigned data portion. In some embodiments, the determined corresponding storage location(s) for the data chunk(s) that are not stored in a storage associated with the first node include one or more of the other nodes of the cluster.

In some embodiments, the data structure does not indicate specific storage locations for the data chunk(s) that are not stored in a storage associated with the first node.

The first node may request from one or more other nodes of the cluster the data chunk(s) associated with the assigned data portion that are not currently stored in a storage associated with the first node. For example, the first node may request from a second node, specific data chunk(s) that the first node determined that are stored in a storage associated with the second node. In another example, the first node sends to the second node a range of file offsets associated with the assigned data portion of the object and requests the second node to provide any data chunk(s) included in the range of file offsets that are stored in a storage associated with the second node.

At 310, the part of the data portion of the object assigned to the first node that is not currently stored in a storage associated with the first node is received from one or more other nodes of the cluster. In response to receiving a request, a second node (e.g., a non-requesting node) may perform a lookup to determine whether any data chunks associated with data portions assigned to the first node (e.g., the requesting node) are stored in a storage associated with the second node. The second node may provide the first node the data chunk(s) that are determined to be stored in a storage associated with the second node.

At 312, the part of the data portion of the object assigned to the first node that is received from the one or more other nodes and the part of the data portion of the object assigned to the first node that is stored in a storage associated with the first node are provided to the target destination. The part of the data portion of the object assigned to the first node that is received from the one or more other nodes may be stored in an in-memory cache associated with the first node upon receipt. The first node may combine the data chunk(s) included in the received part of the data portion with the data chunk(s) of the part of the data portion stored in a storage associated with the first node into a batch of data chunks and provide the batch of data chunks to the target destination.

Figure 4A:
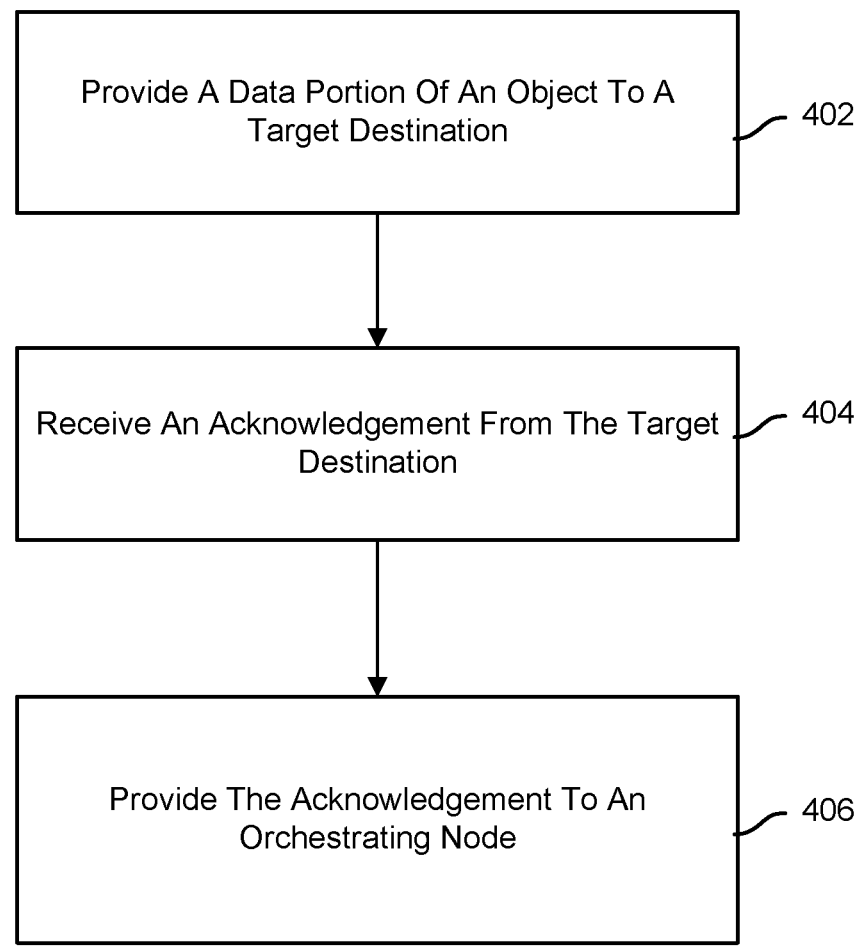
FIG. 4A is a flow diagram illustrating a process for reporting progress of restoring a data portion of an object in accordance with some embodiments.

FIG. 4A is a flow diagram illustrating a process for reporting the progress of restoring a data portion of an object in accordance with some embodiments. In the example shown, process 400 may be implemented by a node, such as one of the nodes 111, 113, 115. In some embodiments, process 400 is implemented to perform some or all of step 214 of process 200.

At 402, a data portion of an object is provided to a target destination. The data portion of the object may be provided to a restore agent that is hosted on the target destination.

At 404, an acknowledgment that indicates the assigned data portion has been restored to the target destination is received from the target destination. A restore agent hosted on the target destination may provide the acknowledgement after all of the data associated with the assigned data portion has been written to a sparse file associated with the object. In some embodiments, the restore agent provides the acknowledgement after a portion of the data associated with the assigned data portion has been written to a sparse file associated with the object (e.g., 4 MB).

At 406, the acknowledgement is provided to an orchestrating node of the cluster. The orchestrating node of the cluster is configured to manage the restoration of the object to the target destination. The orchestrating node may use the acknowledgement to determine which data portions have been restored and which data portions need to be restored. The orchestrating node may use the acknowledgment to determine which data portions need to be reassigned in the event a node goes offline.

The orchestrating node may use the acknowledgment to determine how much of a data portion still needs to be restored to the target destination.

Figure 4B:
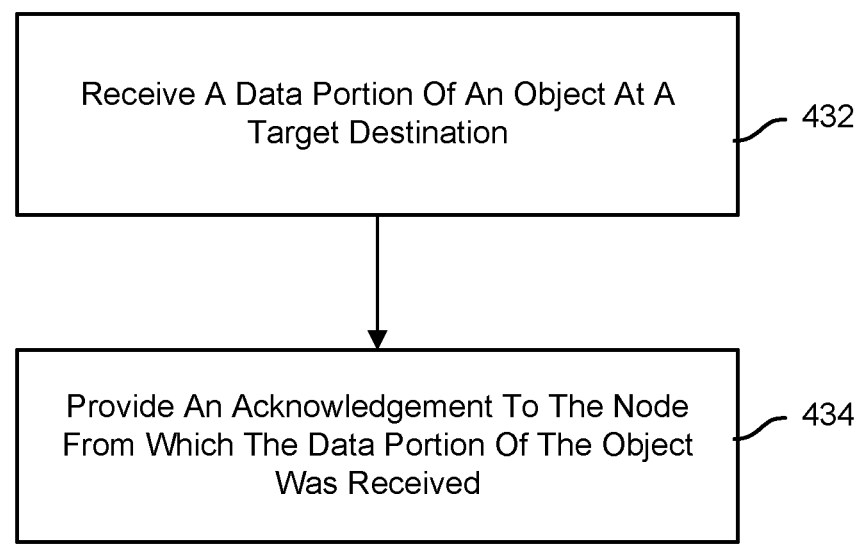
FIG. 4B is a flow diagram illustrating a process for acknowledging a data portion of an object that has been restored in accordance with some embodiments.

FIG. 4B is a flow diagram illustrating a process for acknowledging a data portion of an object that has been restored in accordance with some embodiments. In the example shown, process 430 may be implemented by a restore agent, such as restore agent 104. In some embodiments, process 430 is implemented to perform some or all of step 256 or step 258 of process 250.

At 432, a data portion of an object is received at a target destination. A restore agent hosted on the target destination may receive the data portion. The restore agent may write the data associated with the data portion to a sparse file associated with the object.

At 434, an acknowledgement is provided to the node from which the data portion of the object was received. The acknowledgment indicates that the received data portion has been restored to the target destination. The restore agent may provide the acknowledgment to the node from which the data portion was received.

The restore agent hosted on the target destination may provide the acknowledgement after all of the data associated with the data portion has been written to a sparse file associated with the object. In some embodiments, the restore agent provides the acknowledgement after a portion of the data associated with the assigned data portion has been written to a sparse file associated with the object.

Figure 4C:
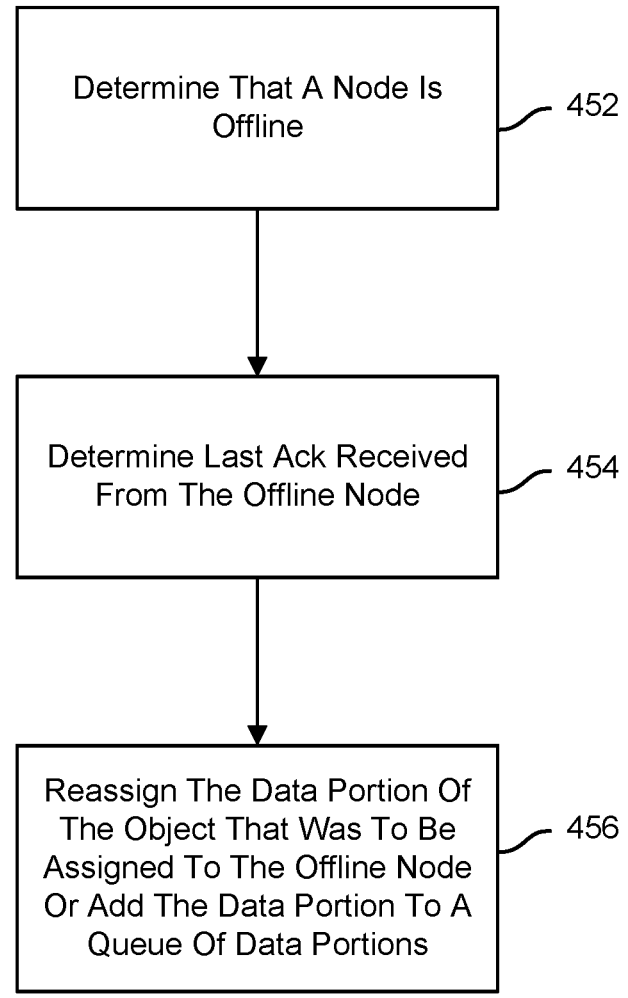
FIG. 4C is a flow diagram illustrating a process for monitoring progress of restoring a data portion of an object in accordance with some embodiments.

FIG. 4C is a flow diagram illustrating a process for monitoring the progress of restoring a data portion of an object in accordance with some embodiments. In the example shown, process 450 may be implemented by a node, such as one of the nodes 111, 113, 115. In some embodiments, process 450 is implemented to perform some or all of step 214 of process 200.

At 452, a node is determined to be offline. An orchestrating node of a cluster may periodically receive heartbeat signals from the node and determine that the node is offline after a heartbeat signal is not received within a threshold period of time. The orchestrating node of the cluster may send a request to the node and determine that the node is offline in the event a response is not received within a threshold period of time.

At 454, a last acknowledgment associated with the offline node is determined. The orchestrating node may store a data structure that associates a data portion with an acknowledgement time stamp. The orchestrating node may inspect the data structure to determine that a data portion associated with the offline node is not associated with an acknowledgement time stamp. This may indicate that the offline node was unable to restore the assigned data portion prior to going offline.

The orchestrating node may inspect the data structure to determine that part of a data portion associated with the offline node is not associated with an acknowledgement time stamp. This may indicate that prior to going offline, the offline node was able to restore a first part of the assigned data portion, but unable to restore a second part of the assigned data portion.

At 456, a data portion of the object that was assigned to the offline node is reassigned to a different node or added to a queue of data portions. This helps to ensure that the entire object is restored to the target destination. In some embodiments, the data portion is reassigned to a different node of the cluster. For example, the data portion may be reassigned to an available node of the cluster. The data portion may be a partial data portion or a full data portion. The offline node may be configured to provide the orchestrating node acknowledgments throughout the process of restoring a data portion. In such a scenario, the orchestrating node may be able to determine a remaining portion of the data portion that needs to be restored to the target destination and reassign the remaining portion to a different node of the cluster.

The offline node may be configured to provide the orchestrating node an acknowledgment after restoring a data portion. In such a scenario, the orchestrating node may be able to determine how much of a data portion currently assigned to the offline node needs to be restored to the target destination and reassign to a different node of the cluster the entirety of the data portion currently assigned to the offline node.

In some embodiments, the other nodes of the cluster are unavailable because they are busy with restoring their corresponding assigned data portions to the target destination. In this situation, the orchestrating node may add the data portion (full or partial) that was assigned to the offline node to the queue of data portions and assign that data portion to another node when a node becomes available.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving a request to restore to a target destination an instance of an object that is stored in a storage associated with a cluster of nodes;

dividing the object into a plurality of data portions, wherein data of the object is stored across the cluster of nodes;

assigning to each node of a plurality of the nodes a corresponding data portion of the plurality of data portions of the object;

determining that a first node of the cluster of nodes does not currently store in a storage associated with the first node at least a part of a corresponding data portion of the object assigned to the first node by inspecting a data structure that indicates corresponding storage locations for data chunks associated with the corresponding data portion of the object assigned to the first node;

providing from the first node to a second node of the cluster a request to provide one or more data chunks included in a range of file offsets that are not are stored in the storage associated with the first node and are stored in a storage associated with the second node, wherein in response to the request, the second node provides to the first node the one or more requested data chunks;

receiving at the first node from the second node of the cluster of nodes the one or more requested data chunks associated with the corresponding data portion of the object assigned to the first node that are not currently stored in the storage associated with the first node and are stored in the storage associated with the second node; and providing from the first node to the target destination, at least the one or more requested data chunks associated with the corresponding data portion of the object assigned to the first node that is received from the second node.

2. The method of claim 1, further comprising determining whether a size of the object is greater than or equal to a size threshold.

3. The method of claim 2, wherein the object is divided into the plurality of data portions in response to determining the size of the object is greater than or equal to the size threshold.

4. The method of claim 1, further comprising providing from the first node to the target destination, the part of the corresponding data portion of the object assigned to the first node that is stored in a storage associated with the first node.

5. The method of claim 4, wherein file offset information is provided with the part of the corresponding data portion of the object assigned to the first node that is received from the second node and the part of the corresponding data portion of the object assigned to the first node that is stored in the storage associated with the first node.

6. The method of claim 5, wherein a restore agent associated with the target destination populates, based on the file offset information, a sparse file with the part of the corresponding data portion of the object assigned to the first node that is received from the second node and the part of the corresponding data portion of the object assigned to the first node that is stored in the storage associated with the first node.

7. The method of claim 1, further comprising providing to the target destination an indication of the object to be restored.

8. The method of claim 7, wherein a restore agent associated with the target destination generates a sparse file for the object in response to receiving the indication of the object to be restored.

9. The method of claim 1, wherein an orchestrating node of the cluster assigns the corresponding data portion of the plurality of data portions of the object to each node of the plurality of the nodes of the cluster.

10. The method of claim 9, wherein each of the data portions of the object have an equal size.

11. The method of claim 1, wherein a node of the cluster receives an acknowledgment from the target destination after providing at least part of an assigned data portion to the target destination.

12. The method of claim 11, wherein the node of the cluster provides the acknowledgement to an orchestrating node of the cluster.

13. The method of claim 1, further comprising determining that a node of the cluster is offline.

14. The method of claim 13, further comprising determining by an orchestrating node of the cluster a last acknowledgement received from the offline node.

15. The method of claim 14, further comprising reassigning to a different node of the cluster a corresponding data portion that was assigned to the offline node.

16. The method of claim 14, further comprising adding to a data portion queue a corresponding data portion that was assigned to the offline node.

17. The method of claim 1, further comprising requesting by the first node from the second node of the cluster of nodes at least the part of the corresponding data portion of the object assigned to the first node.

18. The method of claim 1, where each of the plurality of data portions is associated with a corresponding object metadata structure.

19. A computer program product embodied in a non-transitory computer readable medium and comprising computer instructions for:

receiving a request to restore to a target destination an instance of an object that is stored in a storage associated with a cluster of nodes;

dividing the object into a plurality of data portions, wherein data of the object is stored across the cluster of nodes;

assigning to each node of a plurality of the nodes a corresponding data portion of the plurality of data portions of the object;

determining that a first node of the cluster of nodes does not currently store in a storage associated with the first node at least a part of a corresponding data portion of the object assigned to the first node by inspecting a data structure that indicates corresponding storage locations for data chunks associated with the corresponding data portion of the object assigned to the first node;

providing from the first node to a second node of the cluster a request to provide one or more data chunks included in a range of file offsets that are not are stored in the storage associated with the first node and are stored in a storage associated with the second node, wherein in response to the request, the second node provides to the first node the one or more requested data chunks;

receiving at the first node from the second node of the cluster of nodes the one or more requested data chunks associated with the corresponding data portion of the object assigned to the first node that are not currently stored in the storage associated with the first node and are stored in the storage associated with the second node; and providing from the first node to the target destination, at least the one or more requested data chunks associated with the corresponding data portion of the object assigned to the first node that is received from the second node.

20. A system, comprising:

a processor configured to:

receive a request to restore to a target destination an instance of an object that is stored in a storage associated with a cluster of nodes;

divide the object into a plurality of data portions, wherein data of the object is stored across the cluster of nodes;

assign to each node of a plurality of the nodes a corresponding data portion of the plurality of data portions of the object;

determine that a first node of the cluster of nodes does not currently store in a storage associated with the first node at least a part of a corresponding data portion of the object assigned to the first node by inspecting a data structure that indicates corresponding storage locations for data chunks associated with the corresponding data portion of the object assigned to the first node;

provide from the first node to a second node of the cluster a request to provide one or more data chunks included in a range of file offsets that are not are stored in the storage associated with the first node and are stored in a storage associated with the second node, wherein in response to the request, the second node provides to the first node the one or more requested data chunks;

receive at the first node from the second node of the cluster of nodes the one or more requested data chunks associated with the corresponding data portion of the object assigned to the first node that are not currently stored in the storage associated with the first node and are stored in the storage associated with the second node; and provide from the first node to the target destination, at least the one or more requested data chunks associated with the corresponding data portion of the object received from the second node; and a memory coupled to the processor and configured to provide the processor with instructions.

* * * * *

UNITED STATES PATENT AND TRADEMARK OFFICE
CERTIFICATE OF CORRECTION

PATENT NO. : 11,461,194 B2
APPLICATION NO. : 17/085172
DATED : October 4, 2022
INVENTOR(S) : Gothi et al.

It is certified that error appears in the above-identified patent and that said Letters Patent is hereby corrected as shown below:

In the Specification

In Column 1, Line(s) 60, delete "backup", and insert --back up--, therefor.

Signed and Sealed this
Twenty-fifth Day of July, 2023

Katherine Kelly Vidal
*Director of the United States Patent and Trademark Office*